US008351916B2

(12) United States Patent
Fan et al.

(10) Patent No.: US 8,351,916 B2
(45) Date of Patent: Jan. 8, 2013

(54) STEALTH MODE FOR WIRELESS COMMUNICATIONS DEVICE

(75) Inventors: James Fan, San Ramon, CA (US); David Chen, Fremont, CA (US); Richard Kuo, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 12/963,491

(22) Filed: Dec. 8, 2010

(65) Prior Publication Data

US 2012/0149350 A1    Jun. 14, 2012

(51) Int. Cl.
*H04M 3/00* (2006.01)

(52) U.S. Cl. .................. 455/418; 455/404.1; 455/404.2; 455/456; 455/456.3

(58) Field of Classification Search .................. 455/418, 455/456.3, 404.1, 404.3, 456
See application file for complete search history.

(56) References Cited

U.S. PATENT DOCUMENTS

| 5,515,419 | A  | 5/1996  | Sheffer |
| 5,563,931 | A  | 10/1996 | Bishop et al. |
| 6,466,258 | B1 | 10/2002 | Mogenis et al. |
| 6,784,833 | B1 | 8/2004  | Evans |
| 6,807,564 | B1 | 10/2004 | Zellner et al. |
| 6,816,090 | B2 | 11/2004 | Teckchandani et al. |
| 7,149,774 | B2 | 12/2006 | Zellner et al. |
| 7,221,928 | B2 | 5/2007  | Laird et al. |
| 7,274,924 | B2 | 9/2007  | Yoshioka |
| 7,312,709 | B2 | 12/2007 | Kingston |
| 7,327,229 | B1 | 2/2008  | Nichols et al. |
| 7,518,500 | B2 | 4/2009  | Aninye et al. |
| 2004/0165709 | A1* | 8/2004 | Pence et al. .............. 379/201.01 |
| 2007/0229350 | A1* | 10/2007 | Scalisi et al. .................. 342/350 |
| 2008/0064413 | A1 | 3/2008 | Breed |
| 2009/0085760 | A1 | 4/2009 | Lee |
| 2011/0208545 | A1* | 8/2011 | Kuester ............................ 705/4 |

OTHER PUBLICATIONS

Alarm.com Overview—Android App., "Introducing the Alarm.com Android App", http://www.alarm.com/overview/overview_android.aspx, Jan. 26, 2011, 2 pages.
App Guide, "Motion Sensor Detection Alarm with Spy Audio RecorderCurrent Version: 1.2 (iOS 4.0 Tested)", MacWorld Insider, http://www.macworld.com/appguide/app.html?id=374758&expand=false, Jan. 26, 2011.
Author Unknown, "Eye See U—Video Surveillance", http://eyeseeu.ecaste.com, Jan. 26, 2011, 2 pages.

(Continued)

*Primary Examiner* — Kiet Doan
*Assistant Examiner* — Michael T Vu
(74) *Attorney, Agent, or Firm* — Woodcock Washburn LLP

(57) ABSTRACT

A device is configured to enter a stealth mode in response to a trigger and/or triggering event. The trigger/triggering event can be a voice command, a depression(s) of a button(s) or pattern of buttons on the device, a keyboard and/or softkey entry, entry of a pattern on the display of the device, a designated movement of the device, detection of an event, and/or lack of detection of an event. The device activates the stealth mode without any indication to the user of the device that the device is activating the stealth mode. The stealth mode operates concurrently with all other functions of the device. A virtual secure channel can be established that allows communication with the device without providing an indication that the device is communicating via the virtual secure channel. A token can be utilized for authentication and to discriminate be stealth and normal modes.

17 Claims, 7 Drawing Sheets

OTHER PUBLICATIONS

Buchanan, "Night Recorder App Review", http://www.iphonefreak.com/2010/01/night-recorder-app-revoew.html, Jan. 27, 2010, 12 pages.

Flag Solutions, "Thief Buster Antitheft Alarm", iTunes App Store, http://itunes.apple.com/us/app/thief-buster-antitheft-alarm/id327463179?mt=8, Feb. 11, 2010, 2 pages.

Fun at Work, "Silent Bodyguard—Your Personal Panic Button", http://itunes.apple.com/us/app/silent-bodyguard-your-peronal/id347506878?mt=8, May 10, 2010, 2 pages.

Greenberg, "Android App Aims to Allow Wiretap-Proof Cell Phone Calls", Forbes, http://blogs.forbes.com/firewall/2010/05/25android-app-aims-to-allow-wiretap-proof-cell-phone-calls, May 25, 2010, 3 pages.

GSM Secure, "Silent Panic Buttons—Panic Alarm Systems", http://www.gsm-secure.co.uk/GSM-Panic-Alarrm.php, Jan. 26, 2011, 4 pages.

LoLer Apps, "Anti Theft Alarm: Step Away from the Phone!", www.alarm.com_itunes.apple.com_Anti-Theft-Alarm-stepaway/id368831595?mt=8, Jan. 26, 2011, 2 pages.

Martinelli, "iPhone App Arms Users with Silent Panic Button", Cult of Mac, http://www.cultofmac.com/iphone-app-arms-users-with-silent-panic-button/33862, Mar. 26, 2010, 11 pages.

Zagg Skins, "Undercover Discovers Your Lost or Stolen iPhone", AppCraver iPhone news and Reviews, http://www/appcraver.com/undercover, Jan. 26, 2011, 3 pages.

Martinelli, "iPhone App Arms Users with Silent Panic Button", http://www.cultofmac.com/iphone-app-arms-users-with-silent-panic-button/33862, Mar. 16, 2010, 10 pages.

Macedo "Caught Web-Handed: Social Media become Valuable Tool in Crime-Fighting", http://www.foxnews.com/scitech/2010/03/18/caught-web-handed-social-media-valuable-tool-crime-fighting/, Mar. 18, 2010, 3 pages.

Winder, "IBM: An Unlikely Crime-Fighting Superhero", http://www.daniweb.com/news/story276878.html, Apr. 8, 2010, 3 pages.

* cited by examiner

STEALTH MODE FOR WIRELESS COMMUNICATIONS DEVICE

TECHNICAL FIELD

The technical field generally relates to wireless communications devices and more specifically relates to a wireless communications device capable of operating in a stealth mode.

BACKGROUND

Current communication systems allow a subscriber to dial 911 during an emergency situation. However, the specific emergency may not allow the subscriber to dial 911. For example, a direct 911 call and conversation may not be appropriate in some situations wherein the subscriber has been threatened with force or loss of speaking ability. For example, when the subscriber is in a situation that does not allow him/her to talk (e.g., in a robbery case, if the robber detects that the subscriber is calling 911, the robber may decide to harm the subscriber, kidnapping, automobile accident, etc.).

SUMMARY

In an example configuration, a wireless communications device is configured to enter a stealth mode in response to a trigger. The stealth mode and stealth mode operations are not observable (inconspicuous) to a user of the device. In an example configuration, a virtual security channel is established allowing for communication with the device. The establishment of the virtual stealth channel and the operation of the virtual secure channel are not observable to a user of the device. The virtual security channel allows for concurrent use of the device in normal and stealth mode, with a user of the device not knowing that stealth mode functions are occurring. For example, an authorized third party (e.g., law enforcement authorities) may be able to activate an audio recorder and/or a camera on the device to record information while a user of the device (e.g., perpetrator of a crime) is using the device, without the user knowing that recording is occurring. Thus, the stealth mode acts as a virtual mode operating within the observable (normal) mode of the wireless communications device. Once stealth mode is triggered, it can be disabled only by an authorized event.

When the device is in the stealth mode and is powered on, the device behaves normally. That is, for example, no incoming or outgoing calls are suppressed, no incoming or outgoing messages are suppressed, etc. When the device is powered off (in the stealth mode), the device appears to be powered off. No display, audio, and/or mechanical cues are provided to indicate that the device is operating in the stealth mode. Thus, the device appears to be a completely powered down device. However, functionality of the virtual secure channel, such as a voice channel (unidirectional or bidirectional), a video channel, a text channel, or the like, are available.

In another example embodiment, the device is configured to learn the behavior of a user of the device, such that, if a deviation from a pattern of behavior is detected, when in stealth mode, the device will take predetermined action. In yet another example configuration, the device comprises hardened storage for storing information acquired while the device is in the stealth mode.

DETAILED DESCRIPTION OF ILLUSTRATIVE EMBODIMENTS

Figure 1:
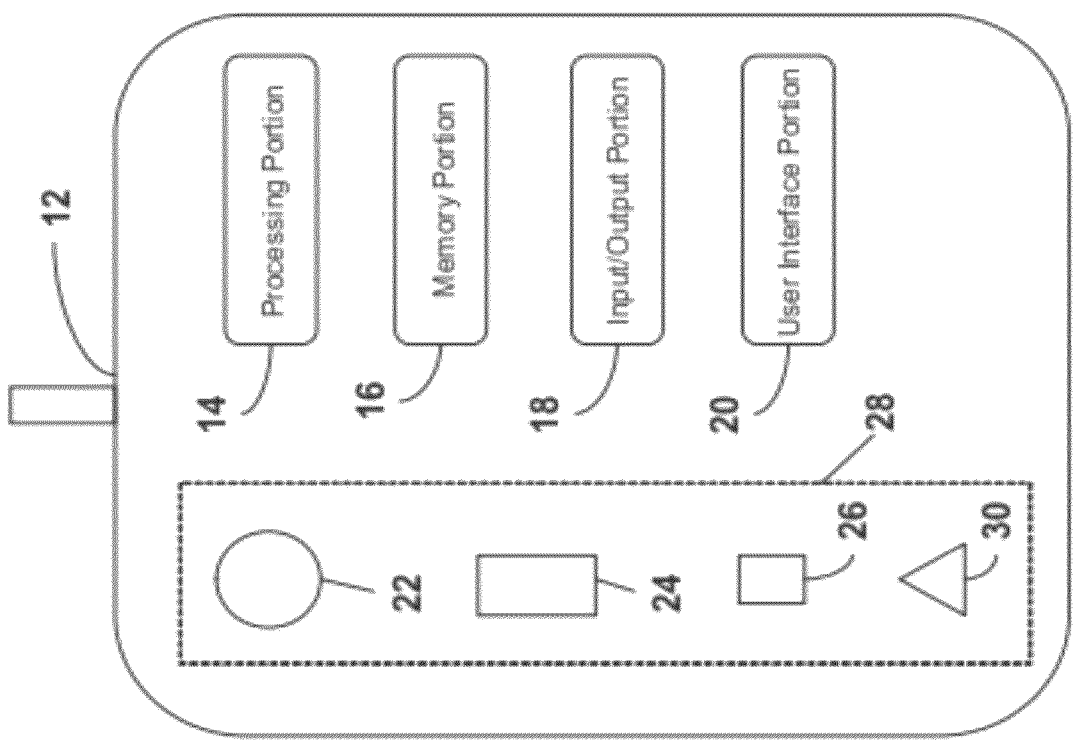
FIG. 1 is a block diagram of an example wireless communications device 12 that can be configured to operate in the stealth mode.

A wireless communications device is configured to enter a stealth mode in response to a trigger. The device activates the stealth mode on the device responsive to detection of a trigger. Performance of functions in the stealth mode is inconspicuous to a user of the device. Performance of functions in the stealth mode is concurrent with the performance of functions in any mode other than the stealth mode. Performance of any function in any mode other than the stealth mode appears to a user of the device as it would if the stealth mode were not activated. The device renders no indication of performance of any function in the stealth mode. The device renders any indication of any function in any mode other than the stealth mode as though the stealth mode were not activated.

In an example configuration, a physical trigger activates the stealth mode. A physical trigger can include a voice command to the device (e.g., a unique command that is not likely to be misinterpreted, such as "Go Go Go"), a push button on the device, multiple depressions of a button on the device, the depression of a pattern of buttons on the device, a keyboard entry on the device, a soft key entry on the device, the entry of a pattern on the display of the device (e.g., enter X pattern with a finger on the display of the device), a designated movement of the device (e.g., move the device in the pattern of a large X), or any combination thereof, for example. Also, the device could be triggered to enter the stealth mode when a particular event is detected, or a particular pattern of events is not detected. For example, if the device detects sudden acceleration or deceleration, the device can activate the stealth mode. As another example, if the device has learned a pattern of movement, such as the itinerary traveled each work day, if the itinerary is deviated from, the device could activate the stealth mode.

The device activates the stealth mode without any indication to the user of the device that the device is activating the stealth mode. The stealth mode operates concurrently with all other functions of the device. In an example configuration, a virtual secure channel is established while in the stealth mode. The virtual secure channel is a secure channel that allows communication with the device without providing, to the user of the device, an indication that the device is communicating via the virtual secure channel. In an example embodiment, when the virtual security channel is established, a token is sent to appropriate recipients. Thus, if a communication session is terminated, communication can be reestablished by the recipient by using the token for authentication to the device.

In an example embodiment, responsive to detection of an appropriate trigger, the device activates the stealth mode and establishes the virtual secure channel. Upon establishing the virtual secure channel, the device establishes either a unidirectional or a bidirectional call in the form of voice call, a text message, or a combination thereof. For example, if a user of a device (e.g., senior citizen) does not follow a known walk route, the device can ask the senior citizen is everything is okay. If the device does not receive a positive response, the device can activate the stealth mode, establish a virtual secure channel, and make a call to an appropriate entity (e.g., medical facility, nursing home, relative, etc.), providing an indication that something is wrong and an indication of the location of the device. In an example embodiment, the device can automatically activate the stealth mode without asking the user if everything is okay.

The call (data, voice, video, or any combination thereof) can be preconfigured as a single threaded call or a multicast call to the subscriber's (user's) emergency contacts using multimedia messaging services, such as email, voice, instant messaging, or the like. Based on the configuration, a single emergency trigger may cause the device to initiate emergency calls in different forms. For example, a single physical trigger may cause the device to initiate a unidirectional E911 voice call, a few twitter messaging calls, a few emails, and/or a video share call. These calls may be preconfigured to be addressed to the same or different recipients. In an example embodiment, call session can be recorded for subsequent retrieval by authorized entities (e.g., the user, law enforcement, etc.).

In an example configuration, when the stealth mode is activated and a virtual secure channel is attempted to be established, but can not be established (e.g., because no carrier signal is detected by the device, or the like), the device will automatically record voice and/or video information. The information can be stored in local storage on the device. And, upon establishment of the virtual secure channel, the stored information, and/or real time voice/video information, can be forward to external storage (storage not on the device). Local storage used for this purpose can not be seen from the viewing menu and thus, there is no way to review the content of the emergency recording without using proper authentication, such as, for example, a subscriber defined token code, password, biometric, or the like. When the device detects a carrier signal, the device will make an attempt to establish a live unidirectional or bidirectional connection along with transmitting recorded content to the recipients. While this is occurring, it is not observable by a user of the device. The device may appear to be idle or even powered off. This prevents a user from becoming suspicious that the device is doing anything other than what the user is expecting the device to do.

When a session or connection is via the virtual secure channel established, the device's geographic location (e.g., latitude and longitude coordinates) can be sent. Additionally, in an example embodiment, a random token can be generated and transmitted to an appropriate recipient or recipients. If a recipient is not available during the trigger time, or the recipient was available but the call/session was terminated for any reason, the recipient can call back by using the random token for authentication to reestablish a unidirectional communication path (e.g., voice, video, data, image, text) with the device. The token can be used to monitor the location of the device, and/or activate recording via the device (e.g., audio, video), as well as establishing a unidirectional connection to the handset at any time. In an example embodiment, the token can be used to monitor the location of the device, and/or active recording via the device, even if the stealth mode has not been activated on the device. For example, in a parent-child or medical caretaker-patient relationship, this token may be established by the parents or medical caretaker rather than the owner/subscriber of the device.

In an example embodiment, to conserve battery life, when the stealth mode is activated and the device is in a powered off state (remembering that the stealth mode operates concurrently with any other mode or state of the device), a timer is activated for a predetermined period of time, such that the device will be directed to go to into a sleep mode and later will be directed to wake up. For example, while the stealth mode if activated, if a user of the device turns the device off, if no communication via the virtual secure channel or recording is occurring, after a predetermined amount of time, the device will go into a sleep mode, wherein the stealth mode is in an idle state, utilizing as little power as possible (e.g., by not transmitting, by turning the transmitter off, etc.). After being in the idle state for a predetermined amount of time, of after a triggering event (e.g., carrier signal is detected) is detected, the device will wake up and thus exit the idle state. This conserves battery life of the device (e.g., when no signal is detected, the cell phone will go to sleep and be waken up a few minutes later to redetect available macrocell or microcell base stations).

When a device is in the stealth mode, it remains in the stealth mode until an appropriate deactivation event (e.g., code, sound, biometric) is detected. Thus even though the device may be powered off or have depleted the battery and later is powered on or recharged, the stealth mode will be active when the device is powered on or recharged. And, all other functions will continue to work properly so that there is no indication that the device is in the stealth mode.

FIG. 1 is a block diagram of an example wireless communications device 12 that can be configured to operate in the stealth mode. In an example configuration, the wireless communications device 12 is a mobile wireless device. The communications device 12 can include any appropriate device, mechanism, software, and/or hardware for facilitating the stealth mode as described herein. As described herein, the communications device 12 comprises hardware or a combination of hardware and software. In an example configuration, the communications device 12 comprises a processing portion 14, a memory portion 16, an input/output portion 18, a user interface (UI) portion 20, and a sensor portion 28 comprising at least one of a video camera portion 22, a force/wave sensor 24, a microphone 26, a moisture sensor 30, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a loud noise, for example. The tilt sensor is capable of detecting a tilt of the communications device. The pressure sensor is capable of sensing pressure against the communications device, such as from a shock wave caused by broken glass or the like. The temperature sensor is capable of sensing an measuring temperature, such as inside of the vehicle, room, building, or the like. The moisture sensor 30 is capable of detecting moisture, such as detecting if the communications device 12 is submerged in a liquid. The processing portion 14, memory portion 16, input/output portion 18, user interface (UI) portion 20, video camera portion 22, force/wave sensor 24, and microphone 26 are coupled together to allow communications therebetween (coupling not shown in FIG. 1). The communications device can comprise a timer (not depicted in FIG. 1).

In an example embodiment, the processing portion 14, utilizing information from the sensor portion 28, is capable of (via appropriate signal processing algorithms and techniques) to distinguish between a loud noise such a siren for example, and the sound of breaking glass. Thus, the communications device 12 is configured to distinguish between a triggering event and a false alarm (an event known not to be a triggering event). For example, the communications device can utilize spectral filtering, can compare known signatures of a triggering event with captured sensor information, or the like, to distinguish between a triggering event and a false alarm. In an example embodiment, a library of known types of triggering events (e.g., broken glass, sensor information indicative of a squealing tires, sensor information indicative of a squealing tires, a vehicle crash, sensor information indicative of a person calling for help, sensor information indicative of a car door being forcibly opened, etc,) can be maintained and updated as needed. The known signatures can be compared to received sensor information to determine if a triggering event is occurring.

In an example embodiment, the communications device can comprise a list of triggering event signatures preloaded by the service provider or the like. These signatures can be compared with information collected by one or more sensors. The correlated data can be ranked e.g., from 1 to 5 level, for example. Wherein, level 1 is indicative of general monitoring (implies any minor activity sensed, to which the communications device will react). And, level 5 can be indicative of a combination of predetermined levels, such as for example, (a) greater than or equal to xx (e.g., 60) decibel (dB) noise sensed, + greater than or equal to xxx (e.g., 10) lbs of pressure sensed+motion within 10 feet or less detected, (b) door unlocked in an unauthorized manner, (c) engine started not using the car key, (d) temperature exceed 120 degrees F., etc. Levels 2-4 can be indicative of sensor indications between level 1 and level 5. The subscriber can direct the communications device what to do based on the level detected. For example, one signature could be noise level 300 db and pressure 10 lbs to imply a glass broken event (a level 5 event).

The communications device also can be configured to possess adaptive learning capability. For example, the subscriber can direct the communications device to memorize a route taken during a walk, commute to work, or the like. When the device detects that the route/commute is being deviated from, the device can query the user as to why the route/commuted is being deviated from, and if an appropriate response is not received, the device can activate the stealth mode. In an example embodiment, the subscriber can configure (program) the device to automatically activate the stealth mode when the device detects a deviation from the route/commute. Other patterns of behavior that can be monitored for deviation, and that can trigger activation of the stealth mode if deviation therefrom is detected include, for example, taking of medication and reporting same, checking in at security points (e.g., by a security guard in a building or on campus grounds, etc.), making rounds at a medical facility, or the like.

In various embodiments, the input/output portion 18 comprises a receiver of the communications device 12, a transmitter of the communications device 12, or a combination thereof. The input/output portion 18 is capable of receiving and/or providing information pertaining to operation in the stealth mode via the communications device 12 as described herein. The input/output portion 18 also is capable of concurrent communications via the virtual secure channel and any other communications mode of the communications device 12, as described herein. For example, the input/output portion 18 can include a wireless communications (e.g., 2.5G/3G/GPS/4G) SIM card. The input/output portion 18 is capable of receiving and/or sending video information, audio information, control information, image information, data, or any combination thereof. In an example embodiment, the input/output portion 18 is capable of receiving and/or sending information to determine a location of the communications device 12. In an example configuration, the input\output portion 18 comprises a GPS receiver. In various configurations, the input/output portion 18 can receive and/or provide information via any appropriate means, such as, for example, optical means (e g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 14 is capable of facilitating the stealth mode via the communications device 12 as described herein. The processing portion is capable of inconspicuously perform stealth mode functions while concurrently performing any other function in any other mode (normal mode functions) other than the stealth mode. For example, the processing portion 14 is capable of, in conjunction with any other portion of the communications device 12, detecting a trigger/triggering event and responsive thereto activating the stealth mode, establishing a virtual secure channel, establishing a communications session via the virtual secure channel, configuring a timer for placing the communications device 12 in a sleep mode and waking the communications device 12 from a sleep mode, or any combination thereof. The processing portion 14, in conjunction with any other portion of the communications device 12, can provide the ability for users/subscribers to enable, disable, and configure various features of the stealth mode as described herein. For example, a user, subscriber, parent, healthcare provider, law enforcement agent, of the like, can define configuration parameters such as, for example, an emergency contact list, voice/text/image/video option for an emergency call, threshold settings (e.g., timer settings, signature settings, etc.). The processing portion 14, in conjunction with any other portion of the communications device 12, allows the communications device 12 to generate and manage emergency tokens per emergency session or per specified duration. These tokens allow recipients to engage in a device without the knowledge of the user of the device. The token also allows the subscriber to view recorded emergency content. The processing portion 14, in conjunction with any other portion of the communications device 12, enables the communications device 12 to covert speech to text when it is configured to also send text messages while in stealth mode. The processing portion 14, in conjunction with any other portion of the communications device 12, allows a subscriber to configure/define triggers and triggering events to activate the stealth mode as described herein. The processing portion 14, in conjunction with any other portion of the communications device 12, provides for concurrent operation of the stealth mode with any other mode of the communications device 12 without providing any indication of the stealth mode to a user of the communications device 12.

In a basic configuration, the communications device 12 can include at least one memory portion 16. The memory portion 16 can store any information utilized in conjunction with providing security via the communications device 12 as described herein. For example, the memory portion 16 is capable of storing information pertaining to location of a communications device 12, subscriber profile information, subscriber identification information, designated phone numbers to send video and audio information, an identification code (e.g., phone number) of the communications device, video information, audio information, control information, information indicative of signatures (e.g., raw individual sensor information, combination of sensor information, processed sensor information, etc.) of known types of triggering events, information indicative of signatures of known types of false alarms (known not to be a triggering event), or a combination thereof. Depending upon the exact configuration and type of processor, the memory portion 16 can be volatile (such as some types of RAM), non-volatile (such as ROM, flash memory, etc.). The communications device 12 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 16, or a portion of the memory portion 14 is hardened such that information stored therein can be recovered if the communications device 12 is exposed to extreme heat, extreme vibration, extreme moisture, corrosive chemicals or gas, or the like. In an example configuration, the information stored in the hardened portion of the memory portion 16 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 16 intelligible.

The communications device 12 also can contain a UI portion 20 allowing a user to communicate with the communications device 12. The UI portion 20 is capable of rendering any information utilized in conjunction with facilitating the stealth mode via the communications device 12 as described herein. The UI portion is capable of rendering no indication of performance of any function in the stealth mode and rendering any indication of any function in any mode other than the stealth mode as though the stealth mode were not activated. As needed, the UI portion can suppress or inhibit rendering of an indication of the performance of a function in the stealth mode.

For example, the UI portion 20 can provide means for entering text, entering a phone number, rendering text, rendering images, rendering multimedia, rendering sound, rendering video, or the like, as described herein. The UI portion 20 can provide the ability to control the communications device 12, via, for example, buttons, soft keys, voice actuated controls, a touch screen, movement of the mobile communications device 12, visual cues (e.g., moving a hand in front of a camera on the mobile communications device 12), or the like. The UI portion 20 can provide visual information (e.g., via a display), audio information (e.g., via speaker), mechanically (e.g., via a vibrating mechanism), or a combination thereof. In various configurations, the UI portion 20 can comprise a display, a touch screen, a keyboard, a speaker, or any combination thereof. The UI portion 20 can comprise means for inputting biometric information, such as, for example, fingerprint information, retinal information, voice information, and/or facial characteristic information. The UI portion 20 can be utilized to enter an indication of the designated destination (e.g., the phone number, IP address, or the like).

In an example embodiment, the sensor portion 28 of the communications device 12 comprises the video camera portion 22, the force/wave sensor 24, and the microphone 26. The video camera portion 22 comprises a camera and associated equipment capable of capturing still images and/or video and to provide the captured still images and/or video to other portions of the communications device 12. In an example embodiment, the force/wave sensor 24 comprises an accelerometer, a tilt sensor, an acoustic sensor capable of sensing acoustic energy, an optical sensor (e.g., infrared), or any combination thereof.

The communications device can be configured, and associated security services can be provided in various embodiments. In one example embodiment, the communications device comprises the video camera, the force/wave sensor, the microphone, the wireless communications SIM Card, a preconfigured outbound communication number, a battery slot (e.g., for a 9-volt battery, AAA battery, etc.), an operating/standby/off switch. In the is embodiment, the communications service can offer the following features. The communications device uses an activation process similar to a wireless handset. When the communications device is switched to a stand-by mode, a delay is initiated (e.g., 20 second delay) before the force/wave sensor starts to operate. When the force/wave sensor detects an intrusion, the communications device will auto dial the preconfigured outbound communication number and start to transmit the captured video and audio information to the designated remote device.

In another example embodiment, the communications device comprises a key pad, a display (e.g., an LED display, or the like), a rechargeable battery pack, and a power indicator (e.g., light). The key pad can be an integral or attached part of the communications device or can be a remote key pad. Along with the services provided above, the communications service, in this embodiment, can offer the following additional services. The (wireless) key pad and the display allowing the owner to key in outbound communication number. The (wireless) key pad and the display allowing the owner to key in a secured pass-code. This pass-code allows the owner to disable the external operating/stand-by/off switch and to soft control the switch mode. When the communications device is switched/set to the stand-by mode, a delay can be initiated (e.g., 20 second delay) before the force/wave sensor starts to operate. When the communications device is equipped with a wireless key pad, the owner can set the mode remotely. When the force/wave sensor detects an intrusion, the communications device will automatically dial the preconfigured outbound number and start to transmit the captured video and audio information to the designated remote device. The rechargeable battery pack can be charged in a car or in a home location. When power is low, the power indicator can provide an indication thereof (e.g., blinking).

In yet another example embodiment, the communications device comprises a two way speaker phone and GPS integration with a video screen. The video screen can optionally comprise a touch screen. Along with the services provided above, the communications service, in this embodiment, can offer the following additional services. The (wireless) key pad and the GPS video screen allowing the owner to key in the outbound communication number. The (wireless) key pad and the GPS video display allowing the owner to key in a secured pass-code. This pass-code allows the owner to disable the external operating/stand-by/off switch and to soft control the switch mode. The communications device can receive an SMS type message from a remote device (e.g., a wireless communications device) which causes the communications device to switch from a stand-by mode to an operating mode. The remote device can send SMS-type messages to the communications device to control the camera (angle, focus, light sensitivity, zoom, etc.) and the volume of the speaker phone. The communications device in conjunction with the GPS video capability allows a two way video and audio communication. Utilizing the GPS functionality, the owner can be provided, via his/her wireless communications device, the location of the communications service. Thus, if a car has been stolen, the owner can receive an indication of the location of the car overlaid on a geographical map. When receiving a communication from the communications service, if the owner is on another call, the call can be preempted, (but not disconnect). Further, a centralized secured database can be utilized to store the video/audio information received from the communications device and can be associated with the communications device identification code and a timestamp. The centralized store video/audio information can be retrieved by subscriber/owner, security service agent, or law enforcement staff on demand.

Figure 2:
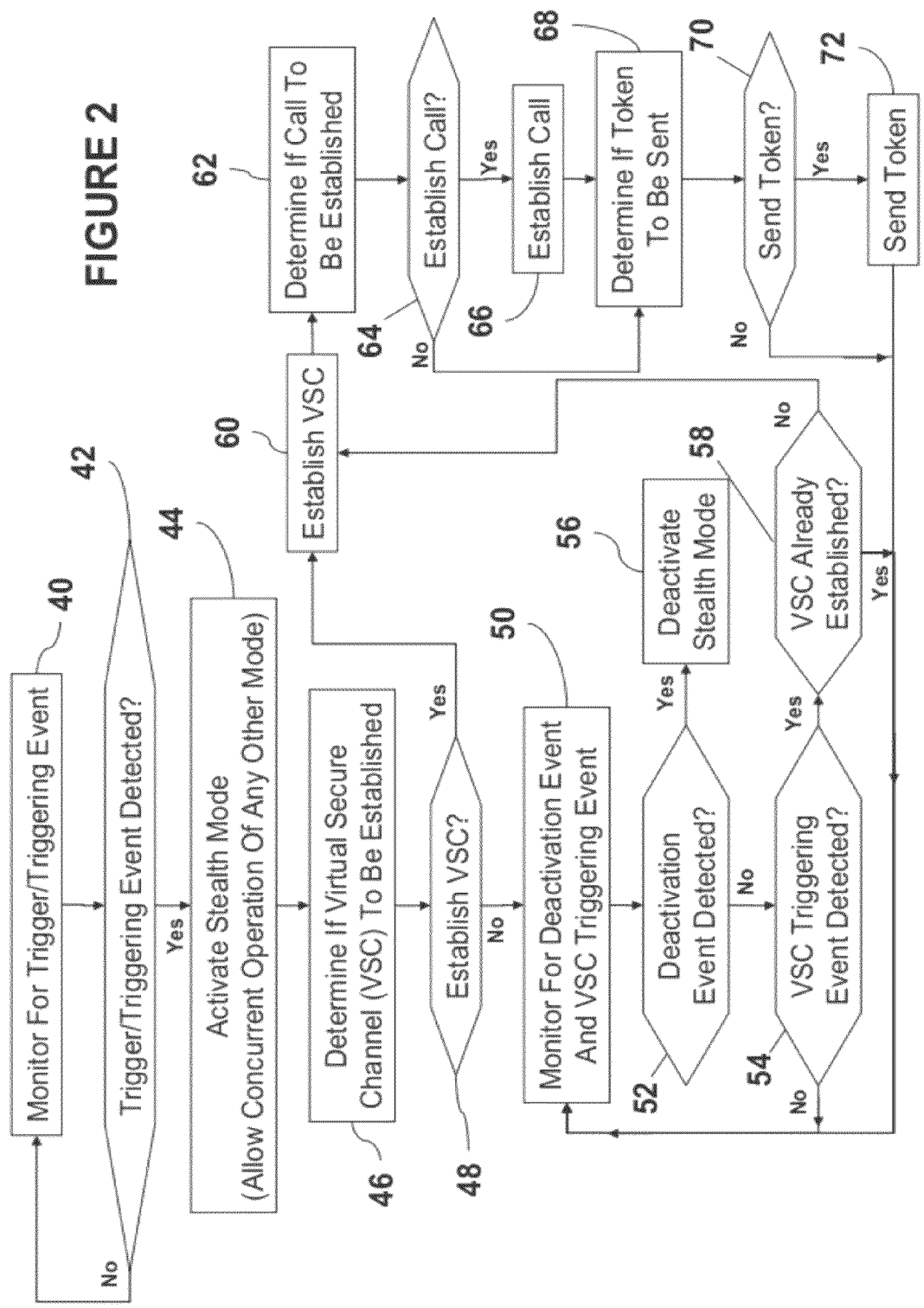
FIG. 2 is a flow diagram of an example process for implementing the stealth mode.

FIG. 2 is a flow diagram of an example process for implementing the stealth mode. The device monitors for a trigger or triggering event to active the stealth mode at step 40. The trigger or triggering event can comprise any appropriate trigger or triggering event as described herein. If, at step 42, a trigger/triggering event is not detected, the process proceed to step 40 to monitor for a trigger/triggering event. If, at step 42, a trigger/triggering event is detected, the stealth mode is activated at step 44. As described herein, the stealth mode runs concurrently with any other mode of the device. At step 46, it is determined if a virtual secure channel (VSC) is to be established.

In an example embodiment, once a virtual secure channel is established, a process can monitor the virtual secure channel and just in case the virtual secure channel is disconnected, the monitoring process can determine if another virtual secure channel needs to be established. When a device in stealth mode is in the sleep mode and wakes up again, if the profile indicates that a previous disconnected virtual secure channel is to be established, the virtual secure channel re-establishment process will be repeated. In another example embodiment, a third party (source external to the device) can facilitate the establishment of the virtual secure channel. For example, when a virtual secure channel is first established, a third party can take control and direct the virtual secure channel auto set up frequency and/or direct the device not to establish the virtual secure channel from the device end, but rather, allow future virtual secure channel setup to be handled/controlled by the third party in order to conserve battery life.

If, at step 48, it is determined that a virtual secure channel is not to be established, the device monitors for an indication to deactivate the stealth mode and to establish a virtual secure channel at step 50. That is, at step 50, the device monitors for a trigger/triggering event that will deactivate the stealth mode and the device monitors for a trigger/triggering event that will establish a virtual secure channel. A trigger/triggering event for deactivating the stealth mode or establishing a virtual secure channel can be any appropriate trigger/triggering event as described herein. If, at step 52, a trigger/triggering event for deactivating the stealth mode is not detected, the stealth mode is deactivated at step 56. If, at step 52, a trigger/triggering event for deactivating the stealth mode is not detected, it is determined, at step 54, if a trigger/triggering event for establishing a virtual secure channel is detected. If, at step 54, a trigger/triggering event for establishing a virtual secure channel is detected is not detected, the process proceeds to step 50. If, at step 54, a trigger/triggering event for establishing a virtual secure channel is detected is detected, it is determined, at step 58, if a virtual secure channel has already been established. If it is determined, at step 58, that a virtual secure channel has already been established, the process proceeds to step 50. If it is determined, at step 58, that a virtual secure channel has not already been established, a virtual secure channel is established at step 60.

If, at step 48, it is determined that a virtual secure channel is to be established, a virtual secure channel is established at step 60. At step 62, it is determined if a call/call session is to be established. The call/call session can be any appropriate call/call session as described herein. For example, the call/call session can be a call establishing communications between from an authorized third party (e.g., law enforcement, parent, etc.). If it is determined, at step 64, that a call/call session is to be established, a call/call session is established at step 66. At step 68, it is determined if a token is to be sent. If it is determined, at step 64, that a call/call session is not to be established, the process proceeds to step 68 to determine if a token is to be sent. If it is determined, at step 70, that a token is to be sent, a token is sent at step 72, and the process proceeds to step 50. If it is determined, at step 70, that a token is not to be sent, the process proceeds to step 50.

The token can be any appropriate token as described herein, and the token can be sent to any appropriate recipient as described herein. A token can, for example, be a text or spoken password, a text or spoken code, a cryptographic key, an authorized biometric (e.g., fingerprint, voiceprint, retinal scan, image), or the like. For example, in stealth mode, the device can send a token to a authorized entity (e.g., law enforcement), and the device can enter the sleep mode. The device can be awakened periodically (or at any appropriate time or occurrence of an event) by the authorized entity using the token to collect information (e.g., sound, still image, video, etc.). And, the collected information can be forward to the authorized entity via the virtual secure channel. In an example embodiment, the device can periodically (or at any appropriate time or occurrence of an event) wake itself up and collect information and send the information to the authorized entity that can be encrypted or the like using the token. The authorized entity can use the token to decrypt the information. Also, as described herein, the authority can establish a reverse connection back to the device and remotely control the device using the token. This allows the device to conserve battery life. Incoming calls using the token will not be treated as a normal call, but rather will be handled in the stealth, providing no indication to a user of the device that the call is being handled. Thus, the authorized entity could establish a monitoring channel to collect information and therefore. Accordingly, the control signal to establish the monitoring channel come from an external source to the device, and the channel over which the collected information is sent, is sent from the device to the authorized entity. In an example embodiment, the authorized entity could control the device to perform special actions such as a loud beep, a sound a blast, etc. to deviate a user's attention when rescue effort is about to start. Also, for example, the authorized entity could control the device to secretly scan a user's finger print(s), scan a user's retina, take a picture, adjust the angle of a camera on the device, or the like.

In an example scenario using a mobile communications device, such as a smart phone, a spoken statement triggers activation of the stealth mode, establishment of a virtual secure channel, and a call to an E911 center. In the example scenario, a subscriber is involved in a carjacking. The subscriber uses the phrase "Please let me go, Please let me go" to trigger activation of the stealth mode on the subscribers device. As previously set up in the subscriber's profile, a detection of the trigger phrase "Please let me go, Please let me go", automatically establishes a virtual secure channel on the device and places a call to an E911 center. Note, that a subscriber can establish several triggers/triggering events that can trigger various actions. The staff at the E911 center listens to the conversation of the carjackers and notifies the appropriate highway patrol.

In more detail expounding upon the example scenario, the subscriber and the subscriber's vehicle are hijacked by two strangers. The subscriber begs the carjackers to release him by using the previously configured trigger phrase "Please let me go, Please let me go" to trigger an E911 unidirectional call. The geographic coordinates of the device are obtained via the GPS. The device generates a session token and the video camera on the device is activated. Video information is captured by the camera. The video camera captures the scenery. The video images, the hijackers' conversation, the geographic location, and the token are transmitted to the E911 center via the appropriate network (e.g., 2G/3G/4G). The E911 center staff is connected. A person at the E911 center hears the conversation of the two carjackers as well as sees some video of the crime scene. The center staff uses the geographic location information to locate the subscriber's vehicle on a highway near the city. The center staff understands that the subscriber is in trouble and immediately dispatches highway patrol, providing appropriate information to the highway patrol. The subscriber's vehicle enters a tunnel and therefore loses wireless connection. The center staff calls back with the token. And, upon exiting the tunnel, the subscriber's device detects the call, suppresses the ring tone and establishes a unidirectional connection between the device and the E911 center. The center staff continues to monitor the vehicle condition and provides the current condition to the highway patrol. The highway patrol stops the vehicle and captures the carjackers.

In another example scenario, using a mobile communications device, such as a smart phone, a sensor on the device automatically triggers activation of the stealth mode, establishment of a virtual secure channel, and a call to an E911 center. In the example scenario, a device is equipped (configured with) with a force sensor (e.g., accelerometer). While the subscriber is driving on a dark stretch of unlit road, the subscriber comes upon an unexpected sharp curve, and loses control of his vehicle. The vehicle collides with a tree, and the subscriber is rendered unconscious. The force sensor detects the collision (force exceeds predefined threshold) and automatically triggers activation of the stealth mode, establishment of a virtual secure channel, and a call to an E911 center.

In more detail expounding upon the example scenario, the subscriber's vehicle collides into a tree which causes him to lose consciousness. The car radio and car engine remain on. The cell device's force sensor detects the collision and automatically initiates activation of the stealth mode, establishment of a virtual secure channel, and a two-way call to an E911 center. The geographic coordinates of the device are obtained via the GPS. The video camera on the device starts to captures the scenery. The video images along with the engine noise and radio sound are transmitted to the E911 center via the appropriate network (e.g., 2G/3G/4G). The E911 center staff is connected. A person at the E911 center hears the sound of the engine and radio, but can not talk to the subscriber. Based on the geographic coordinates, the center staff understands that the subscriber may be in trouble since many accidents have occurred around the same location. The E911 staff decides to dispatch an ambulance to provide aid to the subscriber.

As described herein, the stealth mode can be activated by the following example triggers: behavioral changes, sensor detection (heat, wave, motion, temperature, sound, distance, etc.), voice key words, soft or hard keys, preset timer, etc. All can be preconfigured by the owner of an external service provider. Multiple subscriber profiles describing triggers, triggering events, and actions to be taken, can be preconfigured by the subscriber. Once triggered, there is no way to deactivate the stealth mode other than via an authorized deactivation trigger/triggering event. For example, the stealth mode can be deactivated via a pass code, a voice code, a password, a pass phrase, a biometric, or any combination thereof. When a device is in the stealth mode, the device physically stays on forever (unless battery power is depleted) and hitting a power off key will not cause the device to be powered off. However, if a user attempts to power off the device, the device will appear to be powered off to the user of the device.

Figure 3:
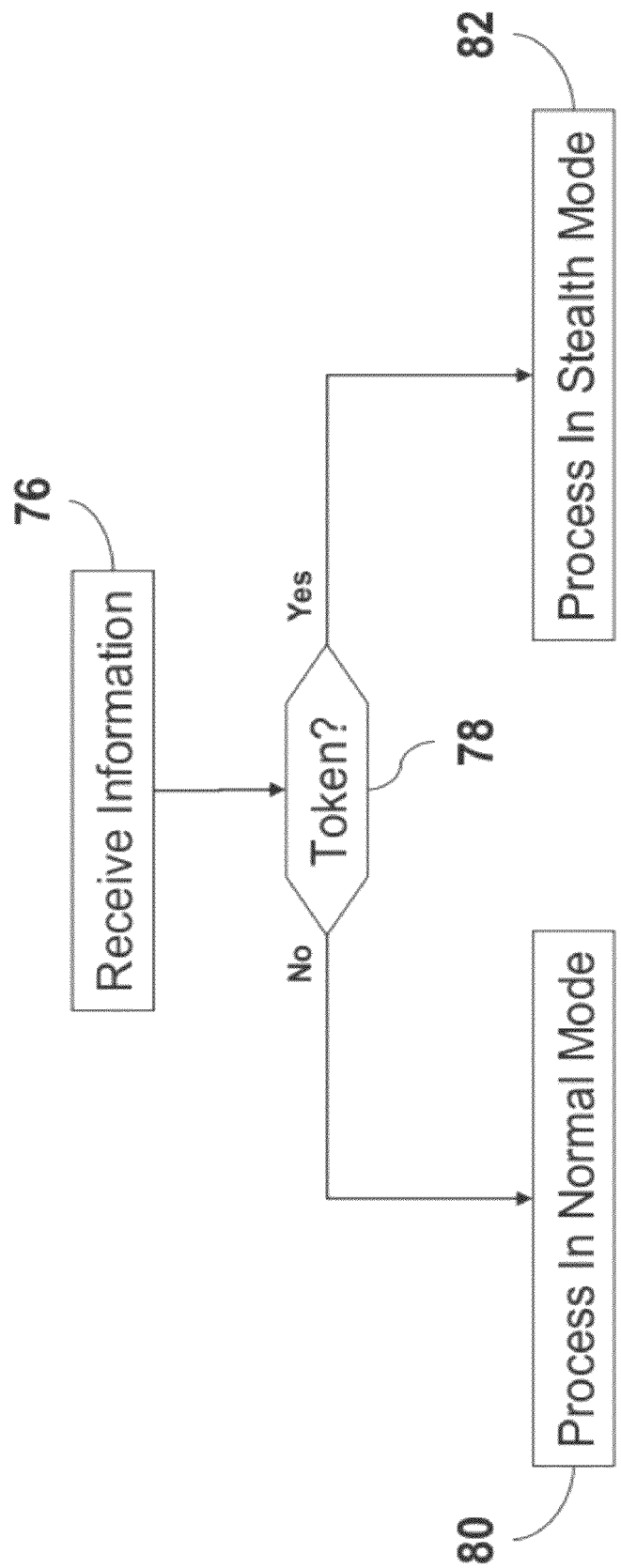
FIG. 3 is a flow diagram of an example process for handling incoming information via a device configured to operate in the stealth mode.

When a device is in the stealth mode, all device functionality will be maintained and continue to operate as if the device is in a normal mode. When a device enters the stealth mode, a profile is verified and notification message along with a randomly generated security code (e.g., token) are sent to appropriate third parties. This token is useful in that, as depicted in FIG. 3, when another remote device is calling or making a connection to the stealth mode device, if the token is used as part of the calling signal, the device will not ring and messages will not show up on the screen of the stealth mode device. From the perspective of a user of the stealth mode device, no external connection is being made. When in the stealth mode, the device will continue to allow phone calls or messages to be sent out and/or incoming calls or messages to be received if no token is part of the signaling. Thus, if an incoming call/message is received (step 76), it is determined if the incoming information has a token (step 78. If the incoming information contains a token, the call/message is handled in the stealth mode (step 82). If the incoming information does not have a token, the call/message is handled in the normal mode (step 80).

The stealth mode notification can be in a variety of forms. The stealth mode notification can be in the form of an SMS message, a voice connection, a VPN, or any appropriate form. In an example embodiment, even though the contacting session may fail to connect to the remote end, all information is periodically sent to a remote server or the like, and the server will make periodical attempts to reach the intended recipients. This not only conserves energy consumption of the stealth mode device, but can be used to save a copy of events occurring from the event start time to the current time, thus allowing a third party to obtain historic information. There is no theoretical limitation as to how many third parties can make secured connection to the stealth mode device. An authorized third party has the ability to monitor what is going on, as well as control the stealth mode device as described herein. In an example configuration, the stealth mode device includes harden storage allowing data to be retrieved even though the device may be exposed to extreme conditions.

The communications device (e.g., communications device 12 can be part of and/or in communication with various wireless communications networks. Some of which are described below.

Figure 4:
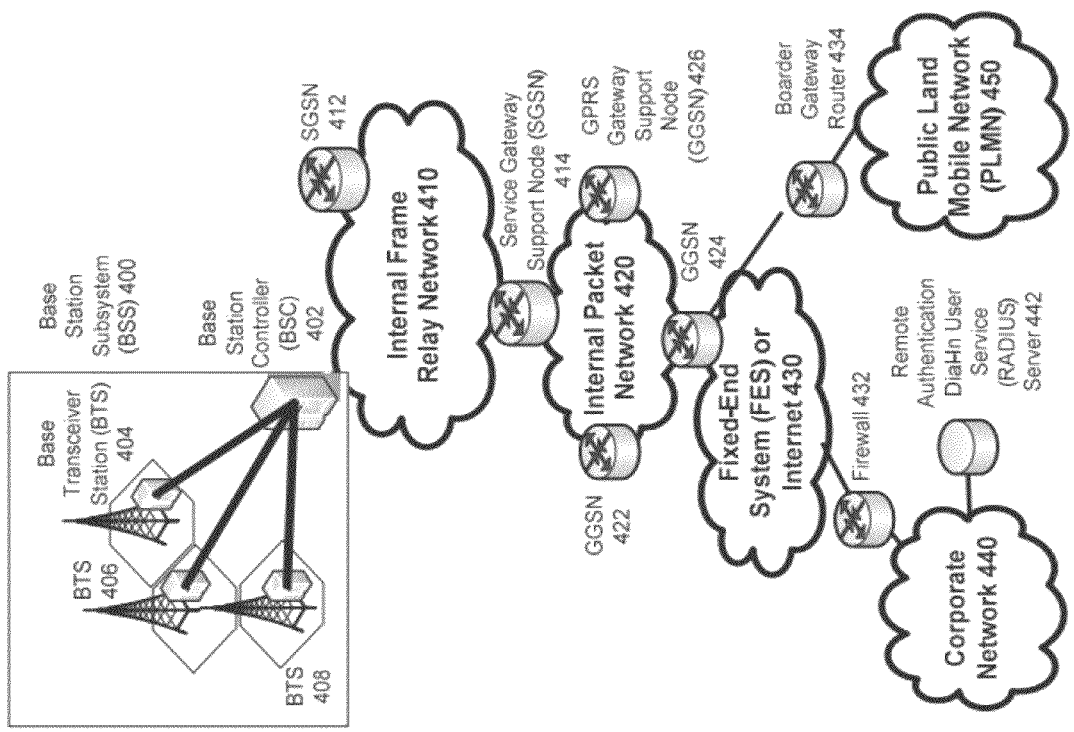
FIG. 4 depicts an overall block diagram of an exemplary packet-based mobile cellular network environment in which a device configured to operate in the stealth mode can be implemented.

FIG. 4 depicts an overall block diagram of an exemplary packet-based mobile cellular network environment, such as a GPRS network, in which a device configure to operate in the stealth mode can be implemented. In the exemplary packet-based mobile cellular network environment shown in FIG. 4, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 5:
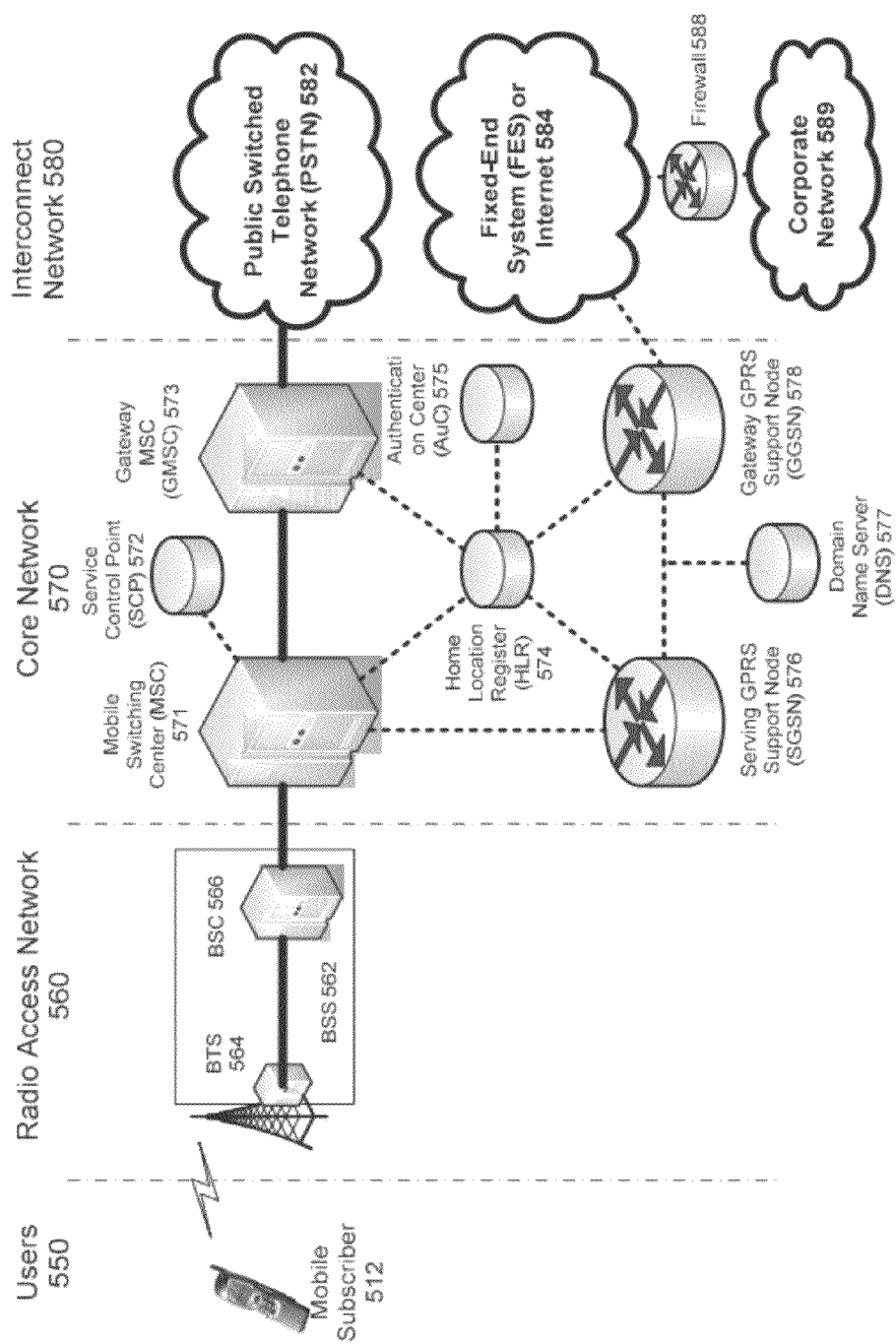
FIG. 5 illustrates an example architecture of a typical GPRS network in which a device configured to operate in the stealth mode can be implemented.

FIG. 5 illustrates an architecture of a typical GPRS network in which a device configure to operate in the stealth mode can be implemented. The architecture depicted in FIG. 5 is segmented into four groups: users 550, radio access network 560, core network 570, and interconnect network 580. Users 550 comprise a plurality of end users. Note, device 512 is referred to as a mobile subscriber in the description of network shown in FIG. 5. In an example embodiment, the device depicted as mobile subscriber 512 comprises a communications device (e.g., wireless anti-theft security communications device 12). Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. Interconnect network 580 also comprises a host of various networks and other network elements. As illustrated in FIG. 5, interconnect network 580 comprises Public Switched Telephone Network ("PSTN") 582, Fixed-End System ("FES") or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network ("PSTN") 582 through Gateway MSC ("GMSC") 573, and/or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate.

The HLR 574 is a centralized database for users to register to the GPRS network. HLR 574 stores static information about the subscribers such as the International Mobile Subscriber Identity ("IMSI"), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 5, when mobile subscriber 512 initiates the attach process by turning on the network capabilities of the mobile device, an attach request is sent by mobile subscriber 512 to SGSN 576. The SGSN 576 queries another SGSN, to which mobile subscriber 512 was attached before, for the identity of mobile subscriber 512. Upon receiving the identity of mobile subscriber 512 from the other SGSN, SGSN 576 requests more information from mobile subscriber 512. This information is used to authenticate mobile subscriber 512 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 512 was attached before, to cancel the location process for mobile subscriber 512. HLR 574 then notifies SGSN 576 that the location update has been performed. At this time, SGSN 576 sends an Attach Accept message to mobile subscriber 512, which in turn sends an Attach Complete message to SGSN 576.

After attaching itself with the network, mobile subscriber 512 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 512. The mobile subscriber 512 uses an algorithm to send the user identification (ID) and password to SGSN 576. The SGSN 576 uses the same algorithm and compares the result. If a match occurs, SGSN 576 authenticates mobile subscriber 512.

Next, the mobile subscriber 512 establishes a user session with the destination network, corporate network 589, by going through a Packet Data Protocol ("PDP") activation process. Briefly, in the process, mobile subscriber 512 requests access to the Access Point Name ("APN"), for example, UPS.com, and SGSN 576 receives the activation request from mobile subscriber 512. SGSN 576 then initiates a Domain Name Service ("DNS") query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol ("PDP") Context Request message that contains necessary information. The GGSN 578 sends a Create PDP Context Response message to SGSN 576, which then sends an Activate PDP Context Accept message to mobile subscriber 512.

Once activated, data packets of the call made by mobile subscriber 512 can then go through radio access network 560, core network 570, and interconnect network 580, in a particular fixed-end system or Internet 584 and firewall 588, to reach corporate network 589.

Figure 6:
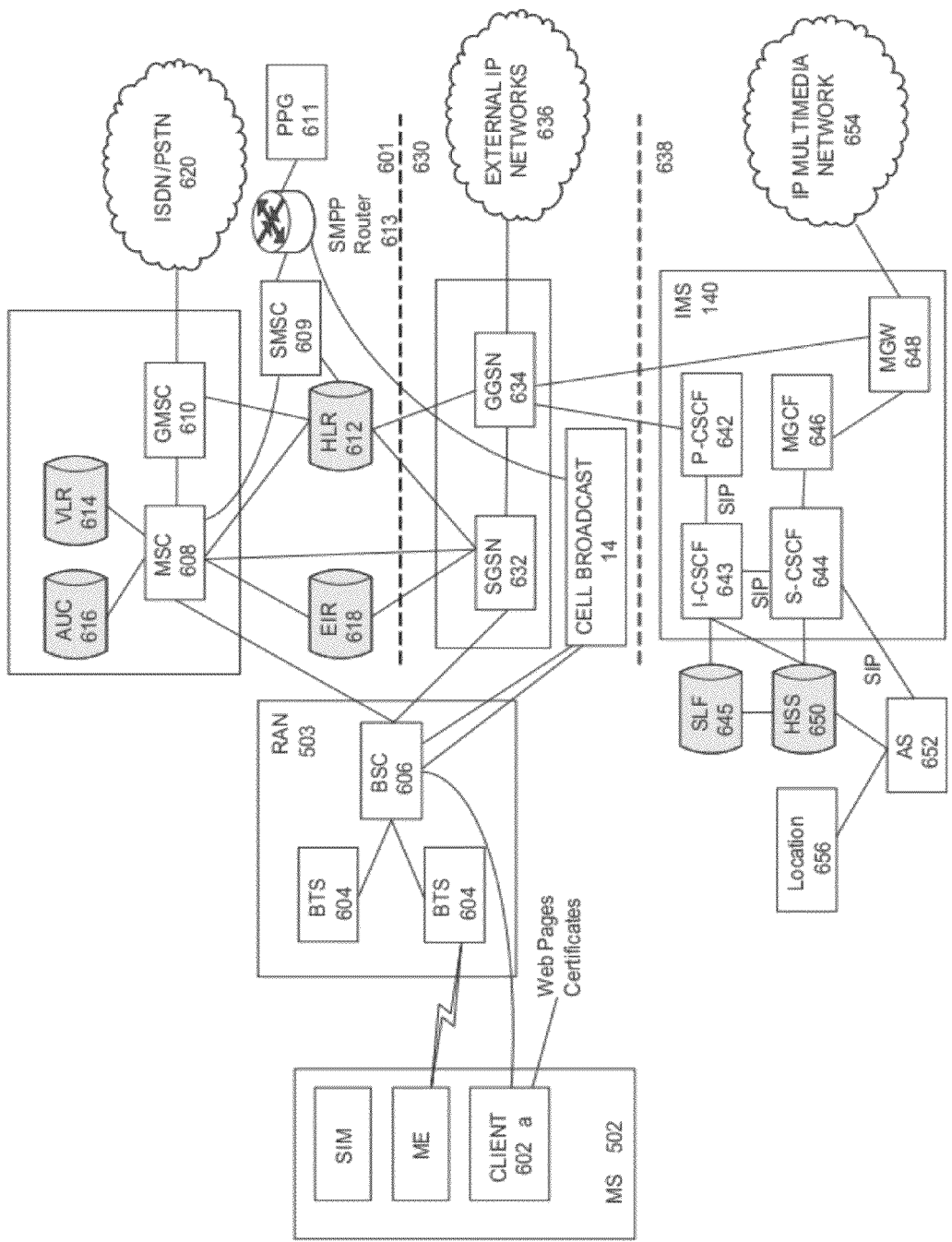
FIG. 6 illustrates an exemplary block diagram view of a GSM/GPRS/IP multimedia network architecture within which a device configured to operate in the stealth mode can be implemented.

FIG. 6 illustrates an exemplary block diagram view of a GSM/GPRS/IP multimedia network architecture within which a device configure to operate in the stealth mode can be implemented. As illustrated, the architecture of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many fgeographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 638 was introduced with 3GPP Release 6, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 7:
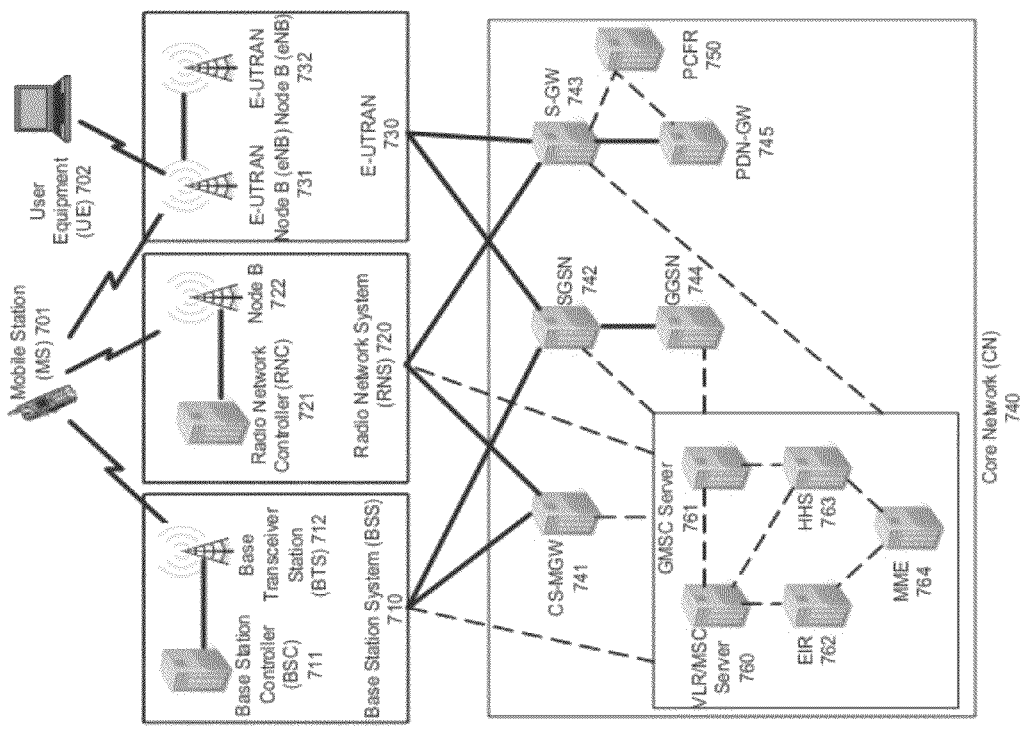
FIG. 7 illustrates a PLMN block diagram view of an exemplary architecture in which a device configure to operate in the stealth mode may be incorporated.

FIG. 7 illustrates a PLMN block diagram view of an exemplary architecture in which the above described embodiments of the device configured to facilitate the stealth mode may be incorporated. Mobile Station (MS) 701 is the physical equipment used by the PLMN subscriber. In one illustrative embodiment, communications device 12 may serve as Mobile Station 701. Mobile Station 701 may be one of, but not limited to, a cellular telephone, a cellular telephone in combination with another electronic device or any other wireless mobile communication device.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. Typically, BSS 710 performs functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 performs functions such as, but not limited to, load control, packet scheduling, handover control, security functions, as well as controlling Mobile Station 701's access to the Core Network (CN) 740.

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 730 may include of series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 701 may communicate with any or all of BSS 710, RNS 720, or E-UTRAN 730. In a illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 740 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information, and stores subscription data regarding Mobile Station 701 or User Equipment 702 for handling calls or data sessions. Networks may contain one HSS 763 or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 provides user location functionality. When Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

While example embodiments of a communications device configured to facilitate a stealth mode have been described in connection with various computing devices/processors, the underlying concepts can be applied to any computing device, processor, or system capable of facilitate a stealth mode as described herein. The methods and apparatuses for facilitating a stealth mode, or certain aspects or portions thereof, can take the form of program code (i.e., instructions) embodied in tangible storage media having a physical structure, such as floppy diskettes, CD-ROMs, hard drives, or any other machine-readable storage medium (computer-readable storage medium), wherein, when the program code is loaded into and executed by a machine, such as a computer, the machine becomes an apparatus for controlling a communications device in accordance with motion thereof. A computer-readable storage medium, as described herein is an article of manufacture. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for facilitate a stealth mode can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for facilitating a stealth mode. When implemented on a general-purpose processor, the program code combines with the processor to provide a unique apparatus that operates to invoke the functionality the stealth mode implementation.

While the stealth mode has been described in connection with the various embodiments of the various figures, it is to be understood that other similar embodiments can be used or modifications and additions can be made to the described embodiments for facilitating a stealth mode. For example, one skilled in the art will recognize that using a communications device to facilitate a stealth mode as described in the present application may apply to any environment, whether wired or wireless, and may be applied to any number of such devices connected via a communications network and interacting across the network. Therefore, facilitating a stealth mode should not be limited to any single embodiment, but rather should be construed in breadth and scope in accordance with the appended claims.

What is claimed:

1. A device comprising:
    memory having executable instructions stored thereon; and
    a processor coupled to the memory, the processor configured to execute the executable instructions to perform operations comprising:
        activating a stealth mode on the device responsive to detection of a trigger;
        inconspicuously performing functions in the stealth mode while concurrently performing functions in any mode other than the stealth mode, wherein:
            no indication of performance of any function in the stealth mode is provided by the device to a user of the device; and
            performance of any function in any mode other than the stealth mode appears to a user of the device as it would if the stealth mode were not activated;
        rendering no indication of performance of any function in the stealth mode;
        rendering any indication of any function in any mode other than the stealth mode as though the stealth mode were not activated;
        determining from a received communication if a token is included with the communication;
        if it is determined that a token is included with the communication, processing the received communication in the stealth mode; and
        if it is determined that a token is not included with the communication, processing the received communication in the a mode other than the stealth mode.

2. The device of claim 1, wherein:
    the processing portion further is configured to:
        establish, in the stealth mode, a virtual secure channel that allows communication with the device without providing, to the user of the device, an indication that the device is communicating via the virtual secure channel;
    the input/output portion further is configured to:
        inconspicuously perform communications via the virtual secure channel, wherein no indication of performance of any communications via the virtual secure channel is provided by the device to a user of the device.

3. The device of claim 1, wherein, if it is determined that a token is included with the communication, allowing the device to be controlled via a source external to the device.

4. The device of claim 1, wherein the trigger comprises a physical action.

5. The device of claim 1, wherein the trigger comprises at least one of a voice command, depression of button, multiple depressions of a button, depression of a pattern of buttons, a keyboard entry, a soft key entry, entry of a pattern on a display of the device, or a designated movement of the device.

6. The device of claim 1, wherein the trigger comprises at least one of detection of an event or lack of detection of an event.

7. A method comprising:
    activating a stealth mode on a device responsive to detection of a trigger;
    inconspicuously performing functions on the device in the stealth mode while concurrently performing functions in any mode other than the stealth mode, wherein:
        no indication of performance of any function in the stealth mode is provided by the device to a user of the device; and
        performance of any function in any mode other than the stealth mode appears to a user of the device as it would if the stealth mode were not activated;
    rendering no indication of performance of any function in the stealth mode;
    rendering any indication of any function in any mode other than the stealth mode as though the stealth mode were not activated;
    determining from a received communication if a token is included with the communication;
    if it is determined that a token is included with the communication, processing the received communication in the stealth mode; and
    if it is determined that a token is not included with the communication, processing the received communication in the a mode other than the stealth mode.

8. The method of claim 7, further comprising:
    establishing, in the stealth mode, a virtual secure channel that allows communication with the device without providing, to the user of the device, an indication that the device is communicating via the virtual secure channel;
    inconspicuously performing communications via the virtual secure channel, wherein no indication of performance of any communications via the virtual secure channel is provided by the device to a user of the device.

9. The method of claim 7, wherein the trigger comprises a physical action.

10. The method of claim 7, wherein the trigger comprises at least one of a voice command, depression of button, multiple depressions of a button, depression of a pattern of buttons, a keyboard entry, a soft key entry, entry of a pattern on a display of the device, or a designated movement of the device.

11. The method of claim 7, wherein the trigger comprises at least one of detection of an event or lack of detection of an event.

12. A computer-readable storage medium that is not a transient signal per se, the computer-readable storage medium having stored thereon executable instructions, the instructions, when executed by the computer, cause the computer to perform operations comprising:
- activating a stealth mode on a device responsive to detection of a trigger;
- inconspicuously perform functions on the device in the stealth mode while concurrently performing functions in any mode other than the stealth mode, wherein:
  - no indication of performance of any function in the stealth mode is provided by the device to a user of the device; and
  - performance of any function in any mode other than the stealth mode appears to a user of the device as it would if the stealth mode were not activated;
- rendering no indication of performance of any function in the stealth mode;
- rendering any indication of any function in any mode other than the stealth mode as though the stealth mode were not activated;
- determining from a received communication if a token is included with the communication;
- if it is determined that a token is included with the communication, processing the received communication in the stealth mode; and
- if it is determined that a token is not included with the communication, processing the received communication in a mode other than the stealth mode.

13. The medium of claim 12, the operations further comprising:
- establish, in the stealth mode, a virtual secure channel that allows communication with the device without providing, to the user of the device, an indication that the device is communicating via the virtual secure channel;
- inconspicuously perform communications via the virtual secure channel, wherein no indication of performance of any communications via the virtual secure channel is provided by the device to a user of the device.

14. The medium of claim 12, the operations further comprising, if it is determined that a token is included with the communication, allowing the device to be controlled via a source external to the device.

15. The medium of claim 12, wherein the trigger comprises a physical action.

16. The medium of claim 12, wherein the trigger comprises at least one of a voice command, depression of button, multiple depressions of a button, depression of a pattern of buttons, a keyboard entry, a soft key entry, entry of a pattern on a display of the device, or a designated movement of the device.

17. The medium of claim 12, wherein the trigger comprises at least one of detection of an event or lack of detection of an event.

* * * * *

UNITED STATES PATENT AND TRADEMARK OFFICE
CERTIFICATE OF CORRECTION

PATENT NO. : 8,351,916 B2  
APPLICATION NO. : 12/963491  
DATED : January 8, 2013  
INVENTOR(S) : James Fan et al.

Page 1 of 1

It is certified that error appears in the above-identified patent and that said Letters Patent is hereby corrected as shown below:

On the Title Page,  
Item (56) References Cited  
OTHER PUBLICATIONS:  
Title Page 2, column 1, "Fun at Work, "Silent Bodyguard–Your Personal Panic Button"," reference delete "http://itunes.apple.com/us/app/silent-bodyguard-your-peronal/" and insert --http://itunes.apple.com/us/app/silent-bodyguard-your-personal/--.

Signed and Sealed this  
Fourth Day of June, 2013

Teresa Stanek Rea  
*Acting Director of the United States Patent and Trademark Office*